(12) United States Patent
Hui et al.

(10) Patent No.: US 12,107,672 B1
(45) Date of Patent: Oct. 1, 2024

(54) PROTOCOL DATA BIT PARSING METHOD AND DEVICE FOR AK PROTOCOL WHEEL SPEED SENSOR

(71) Applicants: SHANGHAI LEEKR TECHNOLOGY CO.LTD., Shanghai (CN); SUZHOU LEEKR TECHNOLOGY CO.LTD., Jiangsu (CN)

(72) Inventors: Zhifeng Hui, Shanghai (CN); Ganting Su, Shanghai (CN); Youkun Li, Shanghai (CN); Peng Cheng, Shanghai (CN)

(73) Assignees: SHANGHAI LEEKR TECHNOLOGY CO.LTD., Shanghai (CN); SUZHOU LEEKR TECHNOLOGY CO.LTD., Suzhou (CN)

( * ) Notice: Subject to any disclaimer, the term of this patent is extended or adjusted under 35 U.S.C. 154(b) by 0 days.

(21) Appl. No.: 18/607,262

(22) Filed: Mar. 15, 2024

Related U.S. Application Data

(63) Continuation of application No. PCT/CN2023/138197, filed on Dec. 12, 2023.

(30) Foreign Application Priority Data

Sep. 21, 2023 (CN) .......................... 202311219505.2

(51) Int. Cl.
H04J 3/06 (2006.01)
(52) U.S. Cl.
CPC ............ *H04J 3/0667* (2013.01); *H04J 3/067* (2013.01)

(58) Field of Classification Search
CPC .. G01P 3/487; G01P 3/489; G01P 3/44; G01P 3/488; G01P 3/00; G01P 3/443;
(Continued)

(56) References Cited

U.S. PATENT DOCUMENTS 11,520,600 B2 * 12/2022 Muth .................. H04B 1/38
2013/0037645 A1 * 2/2013 Niitsuma .......... A01K 89/01555
242/288

(Continued)

FOREIGN PATENT DOCUMENTS

CN 108254586 A 7/2018
CN 111351963 A * 6/2020

(Continued)

OTHER PUBLICATIONS

Tian Jinming, et al., Design of Smart Wheel Speed Sensor Test System Based on LabVIEW, China Academic Journal Electronic Publishing House, Electronic Measurement Technology, Jan. 31, 2022, pp. 153-158.

*Primary Examiner* — Dung B Huynh
(74) *Attorney, Agent, or Firm* — Muncy, Geissler, Olds & Lowe, P.C.

(57) ABSTRACT

A protocol data bit parsing method and device for an AK protocol wheel speed sensor. The method includes receiving a current signal sent by an AK protocol wheel speed sensor and converting the current signal into a first voltage signal and a second voltage signal; capturing the time of rising edges and falling edges of the first voltage signal and the second voltage signal and saving a first timestamp set and a second timestamp set; acquiring a complete set of timestamps of protocol data bits according to the first timestamp set and the second timestamp set and denoting as protocol data timestamps; and parsing the protocol data bits according to the protocol data timestamps to obtain values of the protocol data bits. The method can reduce the product cost (Continued)

and ensure the safety of the supply chain, which improves the competitiveness of enterprises.

7 Claims, 9 Drawing Sheets

(58) Field of Classification Search
CPC ........ G01P 3/481; G01P 3/4815; G01P 3/486; G01P 21/02; G01P 21/00; G01P 13/04; G01P 13/045; H04L 67/12; H04L 2012/40215; H04L 2012/40273; H04L 2012/40208; H04L 12/40; H04L 12/40006; H04L 1/0056; H04L 1/0002; H04L 1/0043; H04L 1/0045; H04L 1/0052; H04L 1/0061; H04L 1/0079; H04L 41/0681; H04L 25/05; H04L 25/4917; H04L 43/16; H04L 47/826; H04L 63/12; H04L 69/04; H04L 69/06; H04L 69/22; H04L 69/26; H04L 9/40; G01D 21/00; G01D 5/145; G01D 5/244; G01D 5/24428; G01D 5/24457; G01D 5/24485; G01D 2205/85; G01D 3/08; B60T 2270/413; B60T 2270/406; B60T 2270/414; B60T 8/171; B60T 8/885; B60T 8/329; B60T 8/17551; B60T 8/1761; B60T 8/32; B60T 8/76; B60T 8/88; B60T 17/22; B60T 17/221; B60T 2270/402; B60T 2270/416; B60T 13/588; B60T 13/662; B60T 7/12; B60R 16/023; H04J 3/0667; H04J 3/067
See application file for complete search history.

(56) References Cited

U.S. PATENT DOCUMENTS

| | | | |
|---|---|---|---|
| 2016/0231141 A1* | 8/2016 | Endres | G01D 5/24466 |
| 2018/0159455 A1* | 6/2018 | Pietromonaco | H02P 25/089 |
| 2018/0174441 A1* | 6/2018 | Hainz | G08C 19/16 |
| 2019/0011292 A1* | 1/2019 | Hainz | G01P 3/489 |
| 2019/0064197 A1* | 2/2019 | Meyer | G01P 21/02 |
| 2019/0066405 A1* | 2/2019 | Zhang | G07C 5/085 |
| 2019/0199451 A1 | 6/2019 | Krall et al. | |
| 2019/0346294 A1* | 11/2019 | Coceani | G01D 5/24428 |
| 2020/0081074 A1* | 3/2020 | Fontanesi | B60T 8/171 |
| 2020/0122700 A1* | 4/2020 | Abaziou | G01P 3/489 |
| 2021/0323521 A1* | 10/2021 | Lee | G01P 21/02 |
| 2021/0356489 A1* | 11/2021 | Fontanesi | G01P 21/00 |
| 2022/0089167 A1* | 3/2022 | Wang | B60W 60/001 |
| 2022/0247336 A1* | 8/2022 | Khosravi | H02P 27/12 |
| 2022/0292767 A1* | 9/2022 | Cheng | G01S 17/894 |
| 2023/0026222 A1* | 1/2023 | Kluftinger | G01D 21/00 |
| 2023/0124590 A1* | 4/2023 | Kluftinger | B60T 17/22 |
| | | | 340/449 |
| 2023/0152344 A1* | 5/2023 | Schroers | G01P 3/4815 |
| | | | 324/174 |
| 2023/0202441 A1* | 6/2023 | Xie | B60T 8/171 |
| | | | 303/20 |
| 2023/0378977 A1* | 11/2023 | Bastien | H03M 13/098 |
| 2023/0400477 A1* | 12/2023 | Friedrich | G01P 3/487 |
| 2024/0140385 A1* | 5/2024 | Xie | B60T 8/88 |

FOREIGN PATENT DOCUMENTS

| | | | | |
|---|---|---|---|---|
| CN | 112208543 A | * | 1/2021 | B60W 40/10 |
| CN | 113485311 A | * | 10/2021 | |
| CN | 113992469 A | * | 1/2022 | G06F 18/25 |
| CN | 114598568 A | * | 6/2022 | |
| CN | 115017095 A | * | 9/2022 | |
| CN | 116373883 A | | 7/2023 | |
| CN | 116962552 A | * | 10/2023 | |
| CN | 117527144 A | * | 2/2024 | |
| CN | 117596106 A | * | 2/2024 | |
| CN | 117607494 A | * | 2/2024 | |
| CN | 220823054 U | * | 4/2024 | |
| CN | 118082722 A | * | 5/2024 | |
| DE | 102017005071 A1 | * | 11/2018 | B60L 3/0038 |
| DE | 102021212324 A1 | * | 5/2023 | B60C 23/061 |
| DE | 102022113709 A1 | * | 11/2023 | |
| EP | 4279873 A2 | * | 11/2023 | G01D 21/00 |
| WO | 2023078510 A1 | | 5/2023 | |

\* cited by examiner

PROTOCOL DATA BIT PARSING METHOD AND DEVICE FOR AK PROTOCOL WHEEL SPEED SENSOR

CROSS REFERENCE TO RELATED APPLICATIONS

This application is a Continuation of the U.S. National Stage of International Application No. PCT/CN2023/138197 filed on Dec. 12, 2023, which claims priority to Chinese Patent Application No. 202311219505.2 on filed Sep. 21, 2023 under 35 U.S.C. § 119; the entire contents of all of which are hereby incorporated by reference.

TECHNICAL FIELD

The present application relates to the technical field of data processing, in particular to a protocol data bit parsing method and device for an AK protocol wheel speed sensor.

BACKGROUND

The AK protocol is a standard interface for wheel speed sensors and electronic control units (ECUs) for the transmission of data signals. The signals of the sensors are processed by signal modulation units to produce speed signals and data signals.

At present, component suppliers mainly use special peripheral chips to parse AK protocol data signals. The solution of parsing AK protocol data signals using special peripheral chips has the following problem: the cost of the special peripheral chips is high.

SUMMARY

To overcome the defects in the prior art, the purpose of embodiments of the present application is to provide a protocol data bit parsing method and device for an AK protocol wheel speed sensor, which can reduce the product cost and ensure the safety of the supply chain, improving the competitiveness of enterprises.

To solve the above problem, the first aspect of the embodiments of the present application discloses a protocol data bit parsing method for an AK protocol wheel speed sensor, comprising the following steps:

Receiving a current signal sent by an AK protocol wheel speed sensor and converting the current signal into a first voltage signal and a second voltage signal, wherein the first voltage signal includes a speed signal pulse and a protocol data bit pulse, and the second voltage signal only includes a speed signal pulse;

Capturing the time of rising edges and falling edges of the first voltage signal and the second voltage signal, denoting timestamps of the rising edge and the falling edge of the captured first voltage signal as a first timestamp set, denoting timestamps of the rising edge and the falling edge of the captured second voltage signal as a second timestamp set and saving the first timestamp set and the second timestamp set;

Acquiring a complete set of timestamps of protocol data bits according to the first timestamp set and the second timestamp set and denoting as protocol data timestamps;

Parsing the protocol data bits according to the protocol data timestamps to obtain values of the protocol data bits.

The embodiments of the present application convert a current signal of the wheel speed sensor into a first voltage signal and a second voltage signal, capture the first timestamp set and the second timestamp set of the rising edge and the falling edge according to the first voltage signal and the second voltage signal, extract timestamps (denoted as protocol data timestamps) of the protocol data bits according to the first timestamp set and the second timestamp set, and parse the protocol data bits, so as to obtain values of the protocol data bits to complete the parsing of the protocol data bits, which can reduce the product cost and improve the competitiveness of enterprises.

As a preferred embodiment, in the first aspect of the embodiments of the present application, the step of receiving a current signal sent by an AK protocol wheel speed sensor and converting the current signal into a first voltage signal and a second voltage signal comprises:

Converting the current signal into a first voltage signal and a second voltage signal based on signal comparison through an AK signal separation circuit.

The AK signal separation circuit can be realized by a comparator, and exemplarily, can complete the conversion of the current signal and the voltage signals through a certain I/V conversion circuit, so as to obtain the corresponding pulse signals based on the comparison of the converted voltage signals and the benchmark voltage signal, and the obtained pulse signals can be denoted as the first voltage signal and the second voltage signal.

For high-speed conditions, since the amplitude of the speed pulse is 28 mA, and the amplitude of the protocol data bit pulse is 14 mA, the first voltage signal and the second voltage signal can be extracted from the high-speed conditions, wherein the high level of the second voltage signal corresponds to the amplitude of the speed pulse of 28 mA, that is to say, the second voltage signal outputs a high level only if the speed pulse is greater than or equal to a first preset value (for example, 23.5 mA), and outputs a low level if the speed pulse is less than the first preset value, which shows that the second voltage signal includes only the speed signal pulse, but not the protocol data bit pulse.

The first voltage signal is also completed through the comparator, the comparator is used for acquiring that the first voltage signal outputs a high level when the amplitude of the pulse is greater than a second preset value (for example, 11.7 mA) and outputs a low level when the amplitude of the pulse is less than the second preset value, and the first voltage signal includes not only the speed signal pulse, but also the protocol data bit pulse.

For low-speed conditions, since the amplitude of the speed pulse is 14 mA, and the amplitude of the protocol data bit pulse is 14 mA, only the first voltage signal can be extracted from the pulse signals under the low-speed conditions, the speed signal pulse is fused between the protocol data bit pulses, and the second voltage signal cannot be extracted separately.

For low-speed to high-speed conditions, since the amplitude of the speed pulse includes not only 14 mA, but also 28 mA, the second voltage signal with the amplitude of the speed pulse of 28 mA and the first voltage signal with the amplitude of the pulse of 28 mA and 14 mA and the amplitude of the protocol data bit pulse of 14 mA can be extracted.

Timestamps of the rising edges and falling edges of the first voltage signal and the second voltage signal can be acquired by an edge capture module. The edge capture module can be implemented in the form of a GTM/TIM module, an eMIOS module or a FlexIO module. Since the rising edge is the moment when the pulse signal changes from 0 to 1, and the falling edge is the moment when the pulse signal changes from 1 to 0, all the time points from 0 to 1 and from 1 to 0 are collected through the edge capture module, that is, the first timestamp set and the second timestamp set are obtained.

As a preferred embodiment, in the first aspect of the embodiments of the present application, under the high-speed conditions, the step of acquiring a complete set of timestamps of protocol data bits according to the first timestamp set and the second timestamp set and denoting as protocol data timestamps comprises:

Within a preset sampling period, determining a timestamp of a rising edge of a last speed pulse and a timestamp of a falling edge of a second last speed pulse based on the second timestamp set, and denoting as a first benchmark high-speed timestamp and a second benchmark high-speed timestamp respectively;

Acquiring all first timestamp sets between the first benchmark high-speed timestamp and the second benchmark high-speed timestamp, wherein all the first timestamp sets between the first benchmark high-speed timestamp and the second benchmark high-speed timestamp are the protocol data timestamps.

Under the high-speed conditions, since a pulse between two adjacent speed pulses is a protocol data pulse, the protocol data timestamps are directly constructed from the pulse between two adjacent speed pulses.

As a preferred embodiment, in the first aspect of the embodiments of the present application, under the low-speed conditions, the step of acquiring a complete set of timestamps of protocol data bits according to the first timestamp set and the second timestamp set and denoting as protocol data timestamps comprises:

Within a preset sampling period, sorting the first timestamp sets within the sampling period in chronological order from back to front;

Selecting a preset number of first timestamps in chronological order from the sorted first timestamp sets to constitute the protocol data timestamps, wherein the difference between any adjacent first timestamps among the protocol data timestamps is within [TP/2, TP], and TP is pulse width;

In the protocol data of the same frame, the difference between two adjacent timestamps is between TP/2 and TP. Therefore, under the low-speed conditions, since only the first voltage signal is available, the first timestamps with the difference between two adjacent timestamps between TP/2 and TP can be used to construct the protocol data timestamps.

As a preferred embodiment, in the first aspect of the embodiments of the present application, under the low-speed to high-speed conditions, the step of acquiring a complete set of timestamps of protocol data bits according to the first timestamp set and the second timestamp set and denoting as protocol data timestamps comprises:

Within a preset sampling period, determining a timestamp of a rising edge of a last speed pulse based on the second timestamp set, and denoting as a first benchmark high-speed timestamp;

From the first benchmark high-speed timestamp, sorting the first timestamp sets within the sampling period in chronological order from back to front;

Selecting a preset number of first timestamps in chronological order from the sorted first timestamp sets to constitute the protocol data timestamps, wherein the difference between adjacent first timestamps among the protocol data timestamps is within [TP/2, TP], and TP is pulse width.

Under the low-speed to high-speed conditions, since the first voltage signal and the second voltage signal are available, the first benchmark high-speed timestamp can be determined from the second voltage signal, and with the first benchmark high-speed timestamp as a starting point, a set of first timestamps which are closest to the first benchmark high-speed timestamp and have the difference between two adjacent timestamps between TP/2 and TP are selected from the first timestamp sets to construct the protocol data timestamps.

As a preferred embodiment, in the first aspect of the embodiments of the present application, the step of parsing the protocol data bits according to the protocol data timestamps to obtain values of the protocol data bits comprises:

Sorting the protocol data timestamps in chronological order;

Determining a value of a first protocol data bit based on a first timestamp among the sorted protocol data timestamps:

If $TimeStamp_0 - TimeStamp_{-2} = 1.5\ TP$, $bit_0 = 0$;

If $TimeStamp_0 - TimeStamp_{-2} = 2\ TP$, $bit_0 = 1$;

Wherein $TimeStamp_0$ is the first timestamp among the sorted protocol data timestamps, and $TimeStamp_{-2}$ is a second timestamp before $TimeStamp_0$ in the first timestamp set; and $bit_0$ is the value of the first protocol data bit;

When $bit_k = 0$, a timestamp corresponding to a center edge of the protocol data bit $bit_k$ is $TimeStamp_{k+1}$, calculating the difference between $TimeStamp_{k+2}$ and $TimeStamp_{k+1}$ and denoting as first difference; if the first difference is TP/2, $bit_{k+1} = 0$; if the first difference is TP, $bit_{k+1} = 1$;

When $bit_k = 1$, a timestamp corresponding to a center edge of the protocol data bit $bit_k$ is $TimeStamp_k$, calculating the difference between $TimeStamp_{k+1}$ and $TimeStamp_k$ and denoting as second difference; if the second difference is TP/2, $bit_{k+1} = 0$; if the second difference is TP, $bit_{k+1} = 1$, wherein $0 \leq k \leq 6$, and TP is pulse width;

Determining a value of $bit_8$ according to the sum of $bit_0$ to $bit_7$, if the sum of $bit_0$ to $bit_7$ is even, $bit_8 = 0$, and if the sum of $bit_0$ to $bit_7$ is odd, $bit_8 = 1$.

The protocol data bit uses Manchester encoding (IEEE 802.3), and the encoding rule thereof is: the jump of the intermediate level of the bit from low to high indicates "1"; and the jump of the intermediate level of the bit from high to low indicates "0". According to the AK protocol standard, the width of the speed pulse is TP (with the nominal value of 50 us), the code element width of the falling edge of the speed pulse and the first protocol data bit is TP/2, the code element in the protocol data timestamp can be determined based on this, and the value of each protocol data bit is parsed based on the Manchester encoding rule and the code element width of the falling edge of the speed pulse and the first protocol data bit of TP/2.

The second aspect of the embodiments of the present application discloses a protocol data bit parsing device for an AK protocol wheel speed sensor, comprising:

A receiving unit, used for receiving a current signal sent by an AK protocol wheel speed sensor and converting the current signal into a first voltage signal and a second voltage signal, wherein the first voltage signal includes a speed signal pulse and a protocol data bit pulse, and the second voltage signal only includes a speed signal pulse;

A capture unit, used for capturing the time of rising edges and falling edges of the first voltage signal and the second voltage signal, denoting timestamps of the rising edge and the falling edge of the captured first voltage signal as a first timestamp set, denoting timestamps of the rising edge and the falling edge of the captured second voltage signal as a second timestamp set and saving the first timestamp set and the second timestamp set;

An acquisition unit, used for acquiring a complete set of timestamps of protocol data bits according to the first timestamp set and the second timestamp set and denoting as protocol data timestamps;

A parsing unit, used for parsing the protocol data bits according to the protocol data timestamps to obtain values of the protocol data bits.

The embodiments of the present application convert a current signal of the wheel speed sensor into a first voltage signal and a second voltage signal, capture the first timestamp set and the second timestamp set of the rising edge and the falling edge according to the first voltage signal and the second voltage signal, extract timestamps (denoted as protocol data timestamps) of the protocol data bits according to the first timestamp set and the second timestamp set, and parse the protocol data bits, so as to obtain values of the protocol data bits to complete the parsing of the protocol data bits, which can reduce the product cost and improve the competitiveness of enterprises.

As a preferred embodiment, in the second aspect of the embodiments of the present application, the parsing unit comprises:

A sorting subunit, used for sorting the protocol data timestamps in chronological order;

A determining subunit, used for determining a value of a first protocol data bit based on a first timestamp among the sorted protocol data timestamps:

If $TimeStamp_0 - TimeStamp_{-2} = 1.5\ TP$, $bit_0 = 0$;

If $TimeStamp_0 - TimeStamp_{-2} = 2\ TP$, $bit_0 = 1$;

Wherein $TimeStamp_0$ is the first timestamp among the sorted protocol data timestamps, and $TimeStamp_{-2}$ is a second timestamp before $TimeStamp_0$ in the first timestamp set; and $bit_0$ is the value of the first protocol data bit;

A first parsing subunit, used for: when $bit_k = 0$, a timestamp corresponding to a center edge of the protocol data bit $bit_k$ is $TimeStamp_{k+1}$, calculating the difference between $TimeStamp_{k+2}$ and $TimeStamp_{k+1}$ and denoting as a first difference; if the first difference is $TP/2$, $bit_{k+1} = 0$; if the first difference is $TP$, $bit_{k+1} = 1$;

A second parsing subunit, used for: when $bit_k = 1$, a timestamp corresponding to a center edge of the protocol data bit $bit_k$ is $TimeStamp_k$, calculating the difference between $TimeStamp_{k+1}$ and $TimeStamp_k$ and denoting as second difference; if the second difference is $TP/2$, $bit_{k+1} = 0$; if the second difference is $TP$, $bit_{k+1} = 1$, wherein $0 \le k \le 6$, and TP is pulse width;

Determining a value of $bit_8$ according to the sum of $bit_0$ to $bit_7$, if the sum of $bit_0$ to $bit_7$ is even, $bit_8 = 0$, and if the sum of $bit_0$ to $bit_7$ is odd, $bit_8 = 1$.

The protocol data bit uses Manchester encoding (IEEE 802.3), and the encoding rule thereof is: the jump of the intermediate level of the bit from low to high indicates "1"; and the jump of the intermediate level of the bit from high to low indicates "0". According to the AK protocol standard, the width of the speed pulse is TP (with the nominal value of 50 us), the code element width of the falling edge of the speed pulse and the first protocol data bit is TP/2, the code element in the protocol data timestamp can be determined based on this, and the value of each protocol data bit is parsed based on the Manchester encoding rule and the code element width of the falling edge of the speed pulse and the first protocol data bit of TP/2.

The third aspect of the embodiments of the present application discloses an electronic device, comprising a memory which stores executable program codes and a processor which is coupled to the memory, wherein the processor invokes the executable program codes stored in the memory to execute the protocol data bit parsing method for an AK protocol wheel speed sensor disclosed in the first aspect of the embodiments of the present application.

The fourth aspect of the embodiments of the present application discloses a computer readable storage medium, which stores a computer program, wherein the computer program enables a computer to execute the protocol data bit parsing method for an AK protocol wheel speed sensor disclosed in the first aspect of the embodiments of the present application.

The fifth aspect of the embodiments of the present application discloses a computer program product, wherein when the computer program product runs on a computer, the computer is enabled to execute the protocol data bit parsing method for an AK protocol wheel speed sensor disclosed in the first aspect of the embodiments of the present application.

The sixth aspect of the embodiments of the present application discloses an application publishing platform, wherein the application publishing platform is used for publishing a computer program product, and when the computer program product runs on a computer, the computer is enabled to execute the protocol data bit parsing method for an AK protocol wheel speed sensor disclosed in the first aspect of the embodiments of the present application.

The embodiments of the present application extract the protocol data timestamps based on the first timestamp set and the second timestamp set, so as to parse the protocol data bits according to the protocol data timestamps to obtain values of the protocol data bits. Compared with the prior art, the embodiments of the present application have the following beneficial effects:

1. No special chip is required to parse the protocol data bits, which reduces the product cost, ensures the safety of the supply chain and improves the competitiveness of enterprises.
2. The field amplitude, mode status, direction information and check information of an intelligent wheel speed sensor can be acquired according to the values of the protocol data bits obtained by parsing.

DETAILED DESCRIPTION

The present specific embodiment is only an explanation of the present application, not a limitation to the present application. Those skilled in the art can make amendments without creative contribution to the present embodiment as required after reading the description, and the amendments are protected by the patent law within the scope of the claims of the present application.

To make the purpose, the technical solution and advantages of the present application more clear, the technical solution of the present application will be clearly and fully described below in combination with the drawings in the present application.

Apparently, the described embodiments are merely part of the embodiments of the present application, not all of the embodiments. Based on the embodiments in the present application, all other embodiments obtained by those ordinary skilled in the art without contributing creative labor will belong to the protection scope of the present application.

The term of "comprise" and any other variant in the description and claims of the present application are intended to cover non-exclusive inclusion, for example, processes, methods, systems, products or devices including a series of steps or units are not limited to those steps or units clearly listed, but include other steps or units that are not listed clearly or are inherent to these processes, methods, products or devices.

In the embodiments of the present application, the words such as "exemplarily" or "for example" are used to indicate taking an example, illustration or explanation. Any embodiment or design scheme described as "exemplarily" or "for example" in the embodiments of the present application shall not be interpreted to be more preferable or superior to other embodiments or design schemes. Exactly, the words such as "exemplarily" or "for example" are intended to present related concepts in a concrete way.

Embodiment 1

Figure 1:
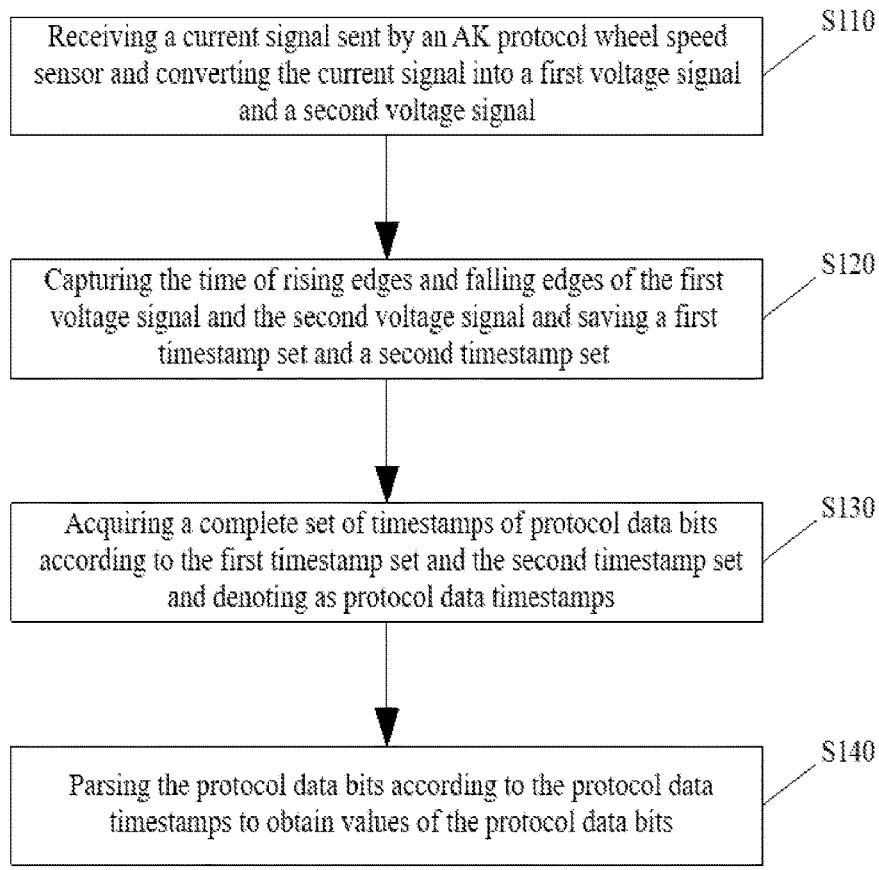
FIG. 1 is a flow diagram of a protocol data bit parsing method for an AK protocol wheel speed sensor disclosed in embodiments of the present application.

FIG. 1 is a flow diagram of a protocol data bit parsing method for an AK protocol wheel speed sensor of embodiments of the present application; Referring to FIG. 1, the method can comprise the following steps:

S110: receiving a current signal sent by an AK protocol wheel speed sensor and converting the current signal into a first voltage signal and a second voltage signal, wherein the first voltage signal includes a speed signal pulse and a protocol data bit pulse, and the second voltage signal only includes a speed signal pulse.

The AK protocol is a standard interface for wheel speed sensors and electronic control units (ECUs) for the transmission of data signals. The signals of the sensors are processed by signal modulation units to produce speed signals and data signals.

The protocol data bits include $bit_0$ to $bit_8$, wherein $bit_0$ indicates a flag bit of incorrect air gap installation, $bit_1$ indicates a working mode of a sensor ("0" for normal, and "1" for abnormal), $bit_2$ indicates a protocol mode bit ("0" for a correct protocol, and "1" for an incorrect protocol), $bit_3$ indicates a valid bit of a direction ("0" for invalid, and "1" for valid), $bit_4$ is an information bit of a direction ("0" for forward, and "1" for reverse), $bit_5$ to $bit_7$ are information bits of an air gap position, $bit_8$ is an odd-even check bit, when the sum of the first 8 bits ($bit_0$ to $bit_7$) is even, $bit_8=0$, and when the sum of the first 8 bits is odd, $bit_8=1$.

Therefore, the field amplitude, mode status, direction information and check information of a wheel speed sensor can be acquired according to the protocol data bits.

In a preferred embodiment of the present application, the current signal can be converted into a first voltage signal and a second voltage signal based on signal comparison through an AK signal separation circuit.

The AK signal separation circuit can be realized by a comparator, and exemplarily, can complete the conversion of the current signal and the voltage signals through a certain I/V conversion circuit, so as to obtain the corresponding pulse signals based on the comparison of the converted voltage signals and the benchmark voltage signal, and the obtained pulse signals can be denoted as the first voltage signal and the second voltage signal.

Figure 2:
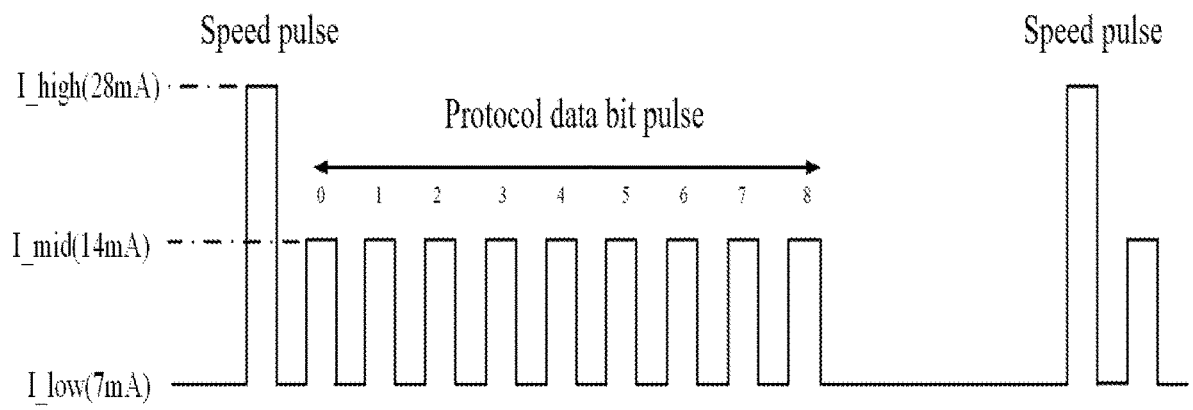
FIG. 2 is a data format chart of an AK protocol under high-speed conditions.

Under the high-speed conditions, the amplitude of the speed pulse is 28 mA, and the amplitude of the protocol data bit pulse is 14 mA. As shown in FIG. 2, when the speed is high, the pulses of the protocol data bits ($bit_0$ to $bit_8$) are not all sent necessarily. Therefore, the first voltage signal and the second voltage signal can be extracted from the high-speed conditions, wherein the high level of the second voltage signal corresponds to the amplitude of the speed pulse of 28 mA, that is to say, the second voltage signal outputs a high level only if the speed pulse is greater than or equal to a first preset value (for example, 23.5 mA), and outputs a low level if the speed pulse is less than the first preset value, which shows that the second voltage signal includes only the speed signal pulse, but not the protocol data bit pulse.

The first voltage signal is also completed through the comparator, the comparator is used for acquiring that the first voltage signal outputs a high level when the amplitude of the pulse is greater than a second preset value (for example, 11.7 mA) and outputs a low level when the amplitude of the pulse is less than the second preset value, and the first voltage signal includes not only the speed signal pulse, but also the protocol data bit pulse.

Figure 3:
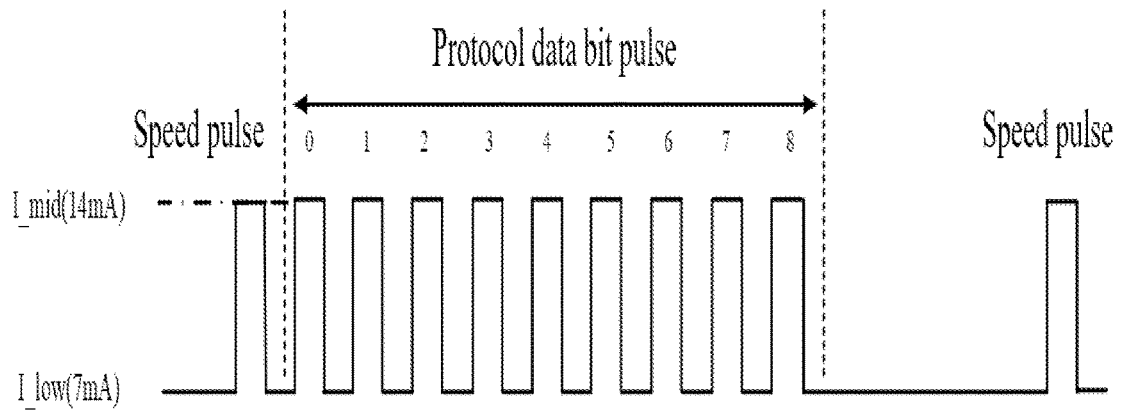
FIG. 3 is a data format chart of an AK protocol under low-speed conditions.

Under the low-speed conditions, the amplitude of the speed pulse is 14 mA, and the amplitude of the protocol data bit pulse is 14 mA, as shown in FIG. 3. Therefore, the second voltage signal with the amplitude of the speed pulse of 28 mA and the first voltage signal with the amplitude of the pulse of 28 mA and 14 mA and the amplitude of the protocol data bit pulse of 14 mA can be extracted.

For low-speed to high-speed conditions, since the amplitude of the speed pulse includes not only 14 mA, but also 28 mA, the second voltage signal with the amplitude of the speed pulse of 28 mA and the first voltage signal with the amplitude of the pulse of 28 mA and 14 mA and the amplitude of the protocol data bit pulse of 14 mA can be extracted.

Figure 4:
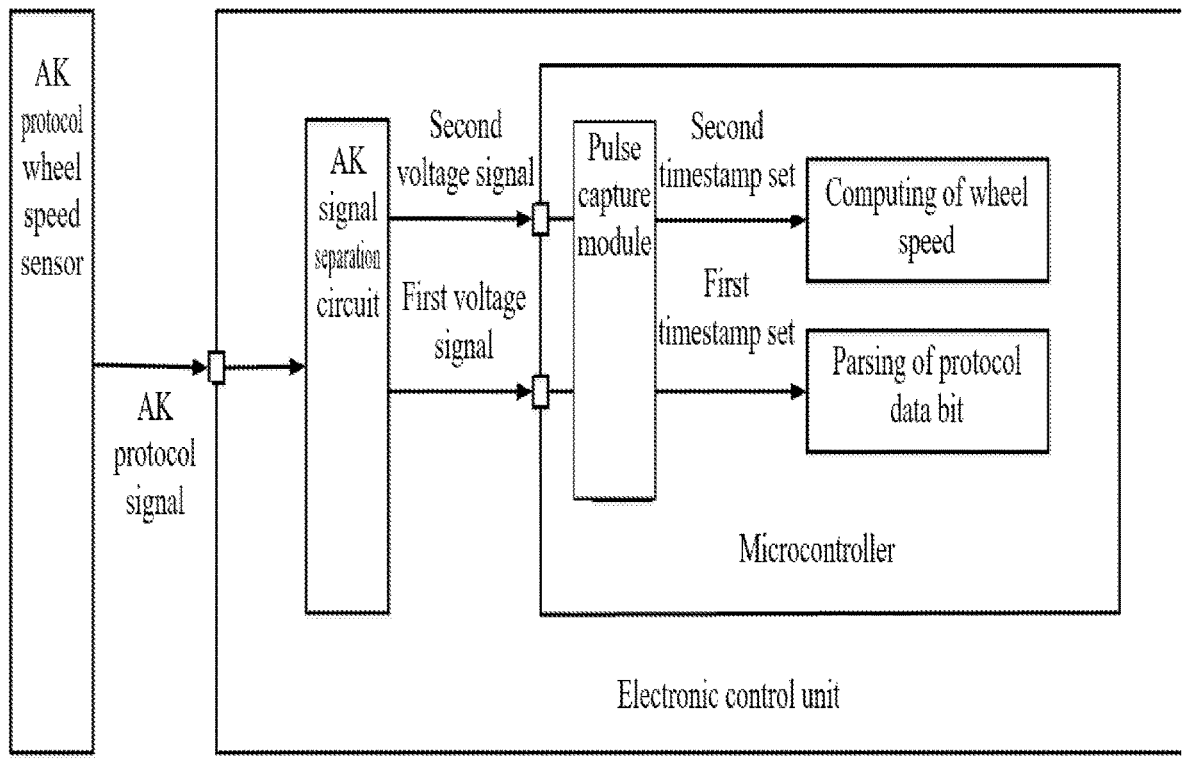
FIG. 4 is a structural block diagram of a protocol data bit parsing system for an AK protocol wheel speed sensor disclosed in embodiments of the present application.

As shown in FIG. 4, the AK signal separation circuit can extract and convert a current signal of an AK protocol into voltage signals WSO1 (i.e. the first voltage signal) and WSO2 (i.e. the second voltage signal) according to different characteristics of amplitudes of the protocol data bit pulse and the speed pulse. WSO1 includes a speed signal pulse and a protocol data bit pulse. WSO2 only includes a speed signal pulse.

S120: capturing the time of rising edges and falling edges of the first voltage signal and the second voltage signal, denoting timestamps of the rising edge and the falling edge of the captured first voltage signal as a first timestamp set, denoting timestamps of the rising edge and the falling edge of the captured second voltage signal as a second timestamp set and saving the first timestamp set and the second timestamp set.

As shown in FIG. 4, the time of rising edges and falling edges of the first voltage signal and the second voltage signal can be captured by a pulse capture module. The edge capture module can collect all the time points from 0 to 1 (rising edge) and from 1 to 0 (falling edge), that is, the first timestamp set and the second timestamp set are obtained. The edge capture module can be implemented in the form of a GTM/TIM module, an eMIOS module or a FlexIO module.

Figure 5:
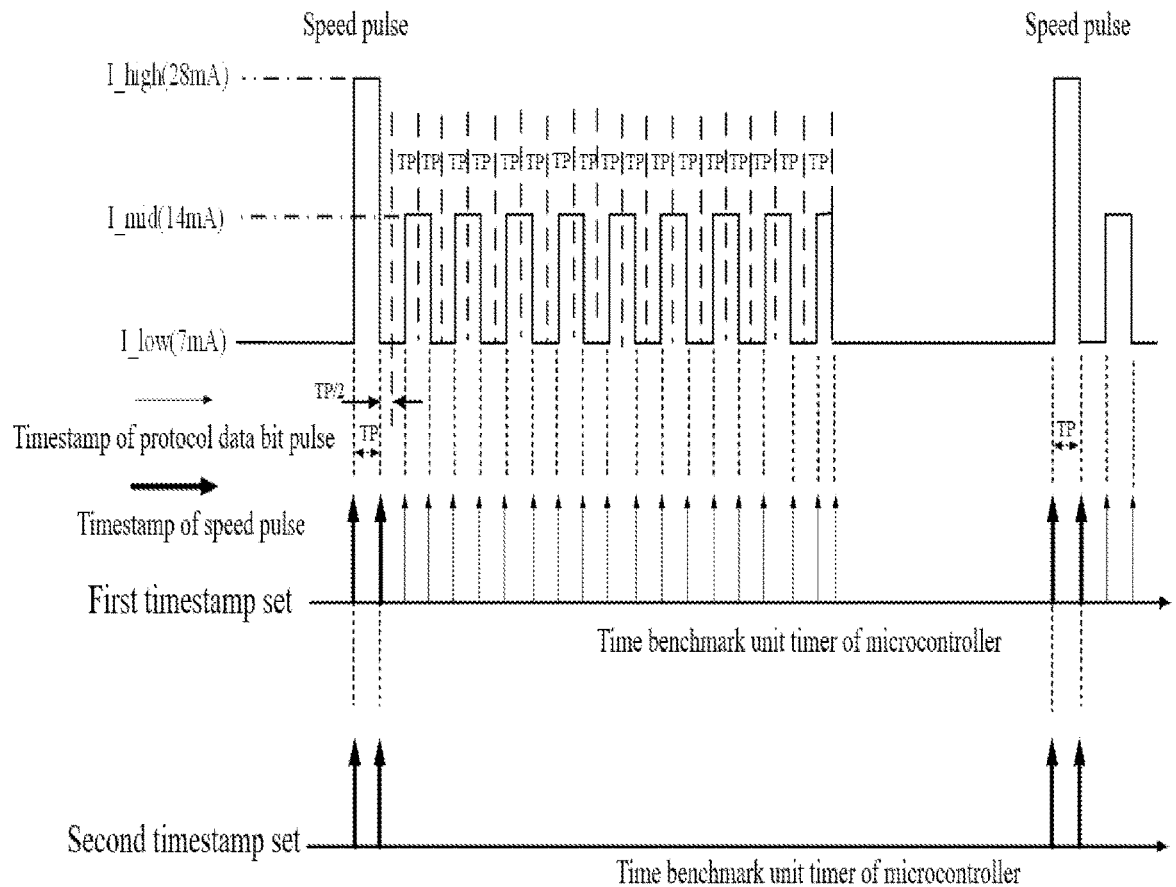
FIG. 5 is a schematic diagram of a timestamp.

The pulse capture module captures the time of the rising edges and the falling edges of WSO1 and WSO2, inputs a timestamp Time Stamp1 (corresponding to the rising edge and the falling edge of WSO1, called the first timestamp set) into a protocol data bit parsing module, and inputs a timestamp Time Stamp2 (corresponding to the rising edge and the falling edge of WSO2, called the second timestamp set) into a wheel speed computing module. The relationship between I_low(7 mA), I_mid(14 mA), I_high(28 mA) and Time Stamp1, Time Stamp2 is shown in FIG. 5. In FIG. 5, TP is pulse width, with a nominal value of 50 us.

Figure 6:
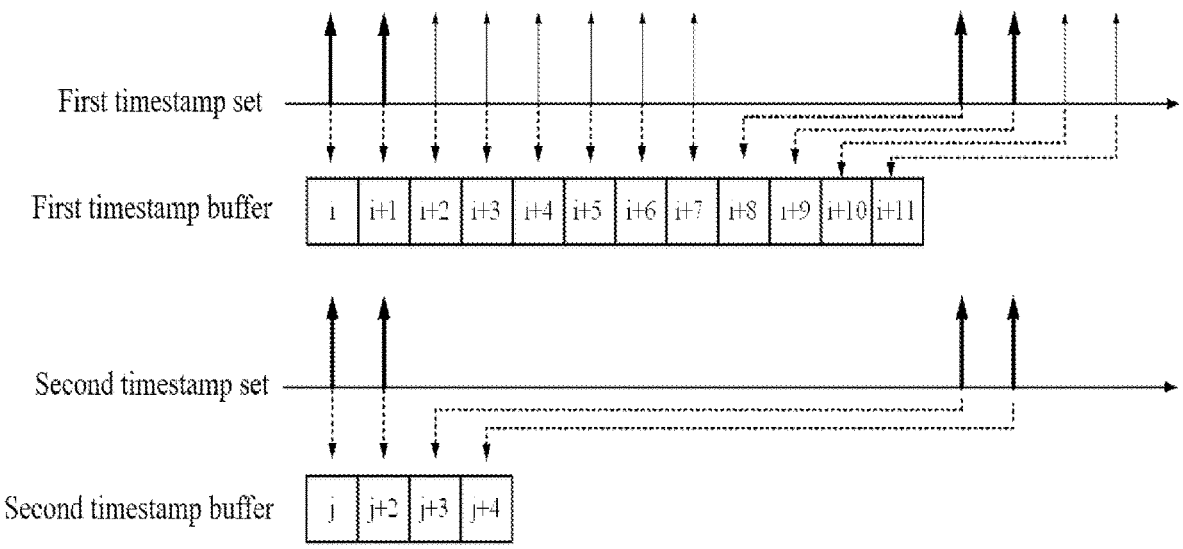
FIG. 6 is a schematic diagram of a buffer.

As shown in FIG. 6, the pulse capture module updates all timestamps captured in the past 5 ms at preset intervals (denoted as sampling time such as 5 ms), and inputs the updated first timestamp set and second timestamp set into two buffers: RecvBuffer_TimeStap1 (i.e., first timestamp buffer) and RecvBuffer_TimeStap2 (i.e., second first timestamp buffer).

S130: acquiring a complete set of timestamps of protocol data bits according to the first timestamp set and the second timestamp set and denoting as protocol data timestamps.

The embodiments of the present application mainly aim at the parsing of protocol data bits under three conditions: high-speed conditions, low-speed conditions and low-speed to high-speed conditions.

Figure 7:
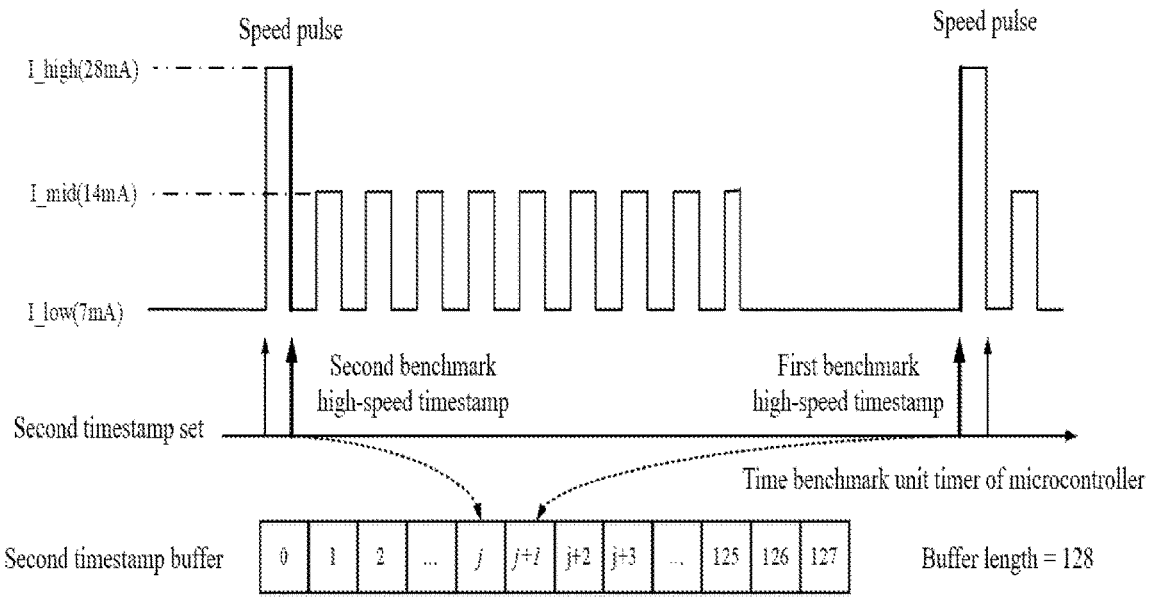
FIG. 7 is a schematic diagram of capture of a speed pulse under high-speed conditions.

Under the high-speed conditions, since a pulse between two adjacent speed pulses is a protocol data pulse, the protocol data timestamps are directly constructed from the pulse between two adjacent speed pulses. Therefore, protocol data timestamps under high-speed conditions can be obtained by the following process:

Within a preset sampling period, determining a timestamp of a rising edge of a last speed pulse and a timestamp of a falling edge of a second last speed pulse based on the second timestamp set, and denoting as a first benchmark high-speed timestamp and a second benchmark high-speed timestamp respectively. As shown in FIG. 7, finding the rising edge (which is a second last timestamp in the second timestamp set) of the captured last speed pulse and recoding the timestamp (NewEdgeTimeStamp, denoted as the first benchmark high-speed timestamp) to RecvBuffer_TimeStap2; and finding the falling edge (which is a third last timestamp in the second timestamp set) of the captured second last speed pulse and recoding the timestamp (PreviousEdgeTimeStamp, denoted as the second benchmark high-speed timestamp) to RecvBuffer_TimeStap2; in RecvBuffer_TimeStap2, PreviousEdgeTimeStamp is stored in an element of Index=j; and NewEdgeTimeStamp is stored in an element of Index=j+1).

Figure 8:
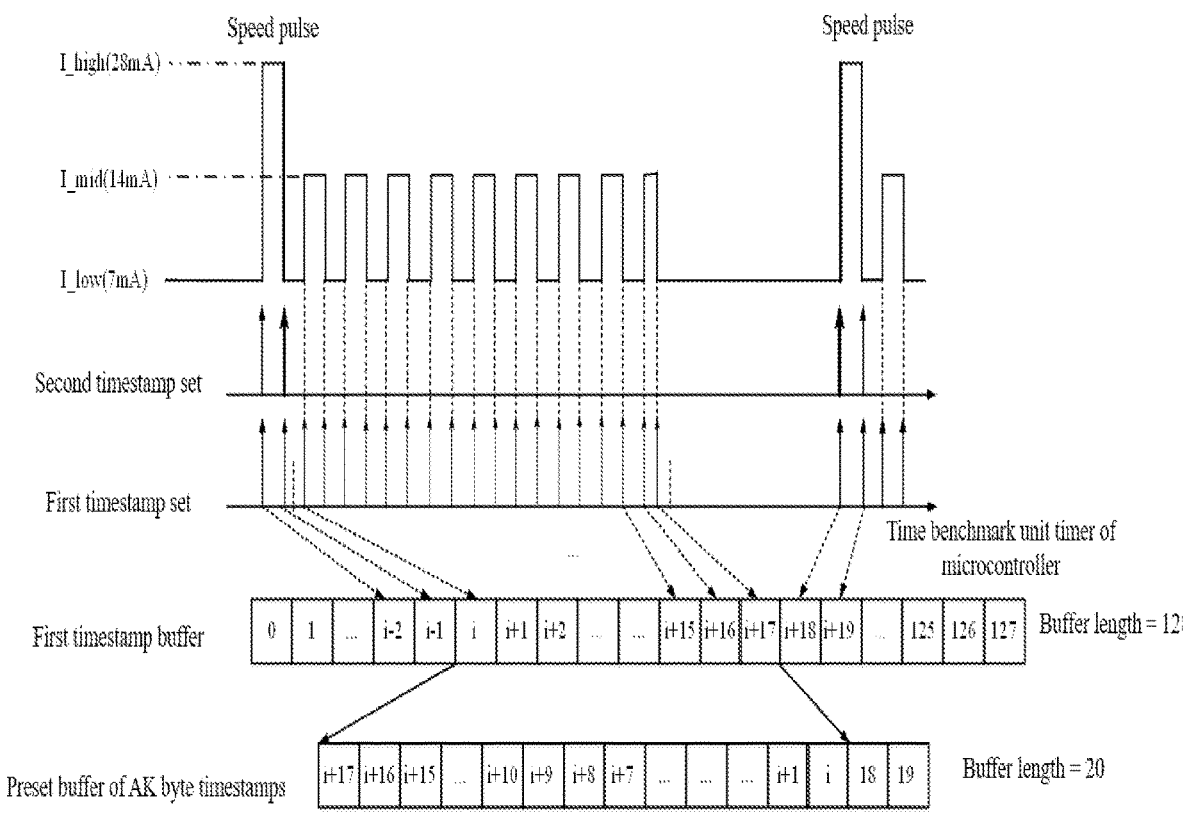
FIG. 8 is a schematic diagram of capture of a protocol data bit under high-speed conditions.

Acquiring all first timestamp sets between the first benchmark high-speed timestamp and the second benchmark high-speed timestamp, wherein all the first timestamp sets between the first benchmark high-speed timestamp and the second benchmark high-speed timestamp are the protocol data timestamps. As shown in FIG. 8, timestamps cached in RecvBuffer_TimeStap1 within the last 5 ms are traversed from back to front to acquire timestamps (all first timestamp sets between the first benchmark high-speed timestamp and the second benchmark high-speed timestamp) between NewEdgeTimeStamp and PreviousEdgeTimeStamp and cache to Buffer_CalAKBitTimeStamp. At this point, within the recently preset sampling period, the last set of timestamps (18 protocol data timestamps in total) of protocol data bits are cached to Buffer_CalAKBitTimeStamp (i.e., a preset buffer of AK byte timestamps).

Figure 9:
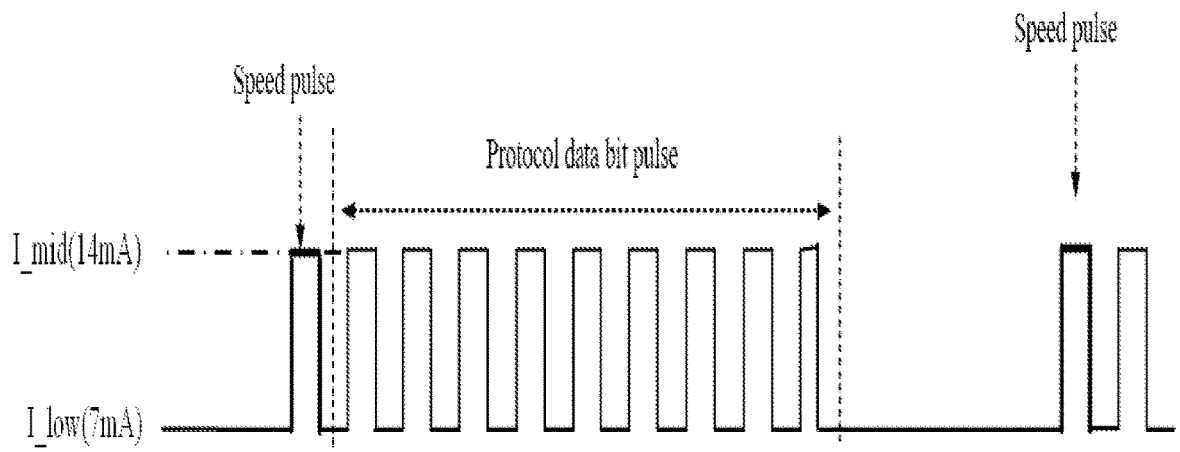
FIG. 9 is a schematic diagram of AK data under low-speed conditions.

As shown in FIG. 9, under the low-speed conditions, the amplitude of the speed pulse is changed to I_mid(14 mA), which is consistent with the amplitude of the protocol data bit pulse.

Figure 10:
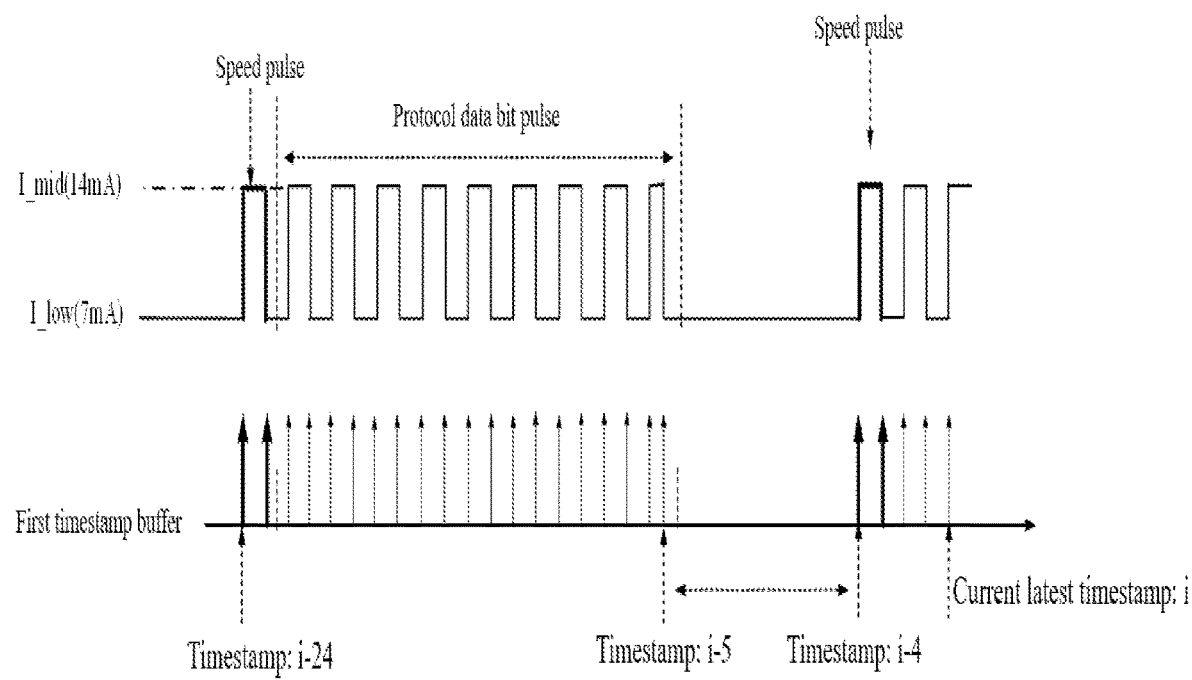
FIG. 10 is a schematic diagram of capture of a protocol data bit under low-speed conditions.

In the protocol data of the same frame, the difference between two adjacent timestamps is between TP/2 and TP. Therefore, under the low-speed conditions, since only the first voltage signal is available, the first timestamps with the difference between two adjacent timestamps between TP/2 and TP can be used to construct the protocol data timestamps, and the specific process is as follows:

Within a preset sampling period, sorting the first timestamp sets within the sampling period in chronological order from back to front;

Selecting a preset number (the preset number here is a fixed value, and the timestamps before and after the fixed value correspond to speed pulse signals) of first timestamps in chronological order from the sorted first timestamp sets to constitute the protocol data timestamps, wherein the difference between any adjacent first timestamps among the protocol data timestamps is within [TP/2, TP], and TP is pulse width. As shown in FIG. 10, timestamps cached in RecvBuffer_TimeStap1 within the last 5 ms are traversed from back to front until the count of successful searches is 20, which is considered to find a complete frame of timestamps of protocol data bits ($bit_0$ to $bit_8$).

Traversing from the current timestamp i, if $TimeStamp_i - TimeStamp_{i-1}$ is between TP/2 and TP, it is considered that $TimeStamp_{i-1}$ and $TimeStamp_i$ belong to the same frame of protocol data, and the count of successful searches is increased by 1 to carry out forward recursive search in sequence. If $TimeStamp_{i-5} - TimeStamp_{i-4}$ is greater than TP, the search fails, and the count is cleared. A traversal search is started from i-5 until i-24. At this moment, the count is up to 20, and the traversal is successful. $TimeStamp_{i-5}$ to $TimeStamp_{i-22}$ (18 protocol data timestamps in total) are cached to Buffer_CalAKBitTimeStamp.

Figure 11:
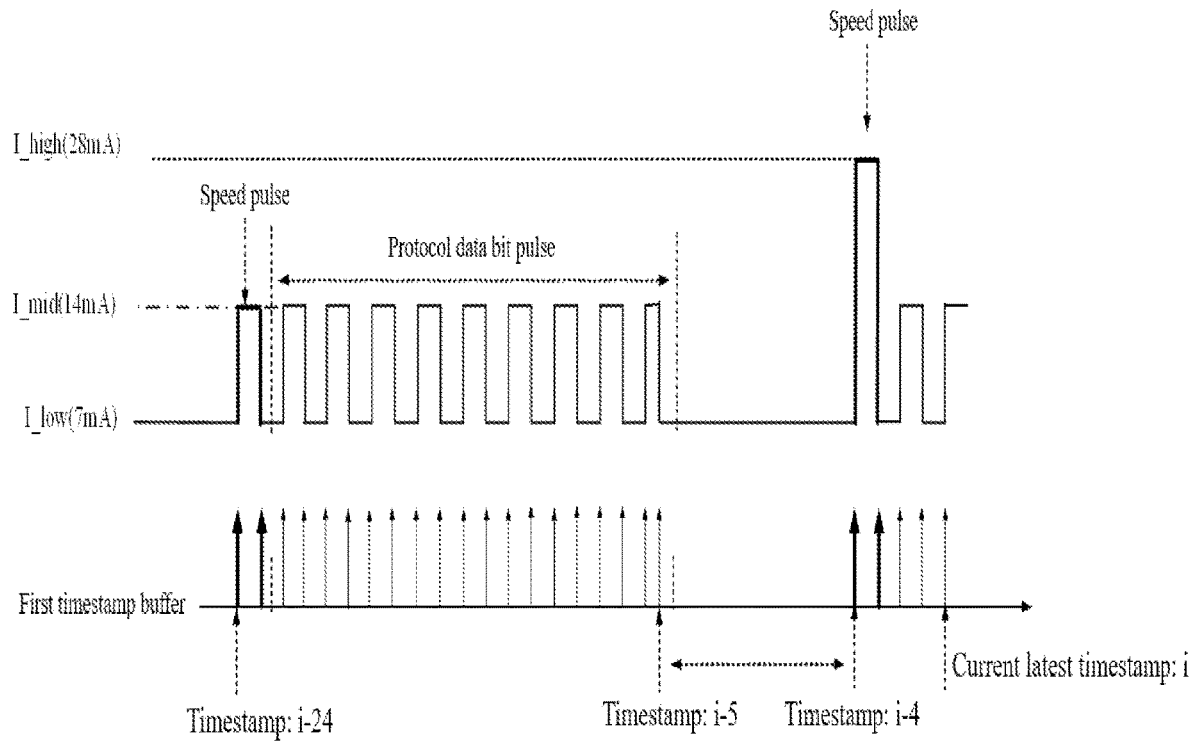
FIG. 11 is a schematic diagram of capture of a protocol data bit under low-speed to high-speed conditions.

As shown in FIG. 11, under the low-speed to high-speed conditions, the amplitude of the speed pulse is changed from I_mid(14 mA) to I_high(28 mA).

The low-speed to high-speed conditions can be regarded as a combination of the low-speed conditions and the high-speed conditions. Since the first voltage signal and the second voltage signal are available, the first benchmark high-speed timestamp can be determined from the second voltage signal, and with the first benchmark high-speed timestamp as a starting point, a set of first timestamps which are closest to the first benchmark high-speed timestamp and have the difference between two adjacent timestamps between TP/2 and TP are selected from the first timestamp sets to construct the protocol data timestamps. The specific process is as follows:

Within a preset sampling period, determining a timestamp of a rising edge of a last speed pulse based on the second timestamp set, and denoting as a first benchmark high-speed timestamp;

From the first benchmark high-speed timestamp, sorting the first timestamp sets within the sampling period in chronological order from back to front;

Selecting a preset number of first timestamps in chronological order from the sorted first timestamp sets to constitute the protocol data timestamps, wherein the difference between adjacent first timestamps among the protocol data timestamps is within [TP/2, TP], and TP is pulse width.

In FIG. 11, finding the rising edge of the captured last speed pulse and recoding the timestamp $TimeStamp_{i-4}$. Traversing from the current timestamp i, if $TimeStamp_i$ is greater than $TimeStamp_{i-4}$, which does not meet the search condition, carrying out forward recursion in sequence until $TimeStamp_{i-5}$ is less than $TimeStamp_{i-4}$. At this moment, it is considered that the timestamp of the first protocol data bit is found, and the count of successful searches is increased by 1 to start a traversal search from i-5 until i-24. At this moment, the count is up to 20, and the traversal is successful. $TimeStamp_{i-5}$ to $TimeStamp_{i-22}$ (18 protocol data timestamps in total) are cached to Buffer_CalAKBitTimeStamp.

S140: parsing the protocol data bits according to the protocol data timestamps to obtain values of the protocol data bits.

Figure 12:
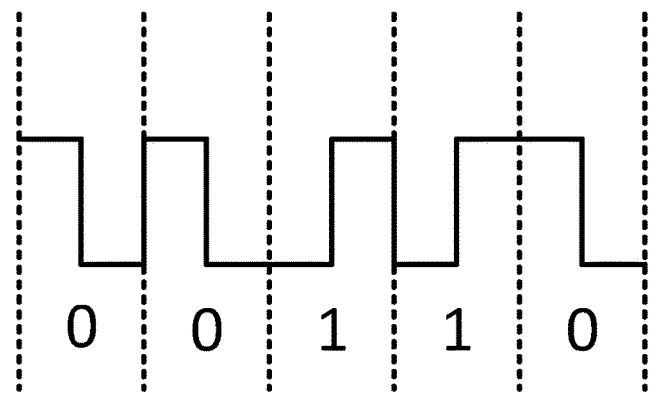
FIG. 12 is a schematic diagram of Manchester encoding.
Figure 13:
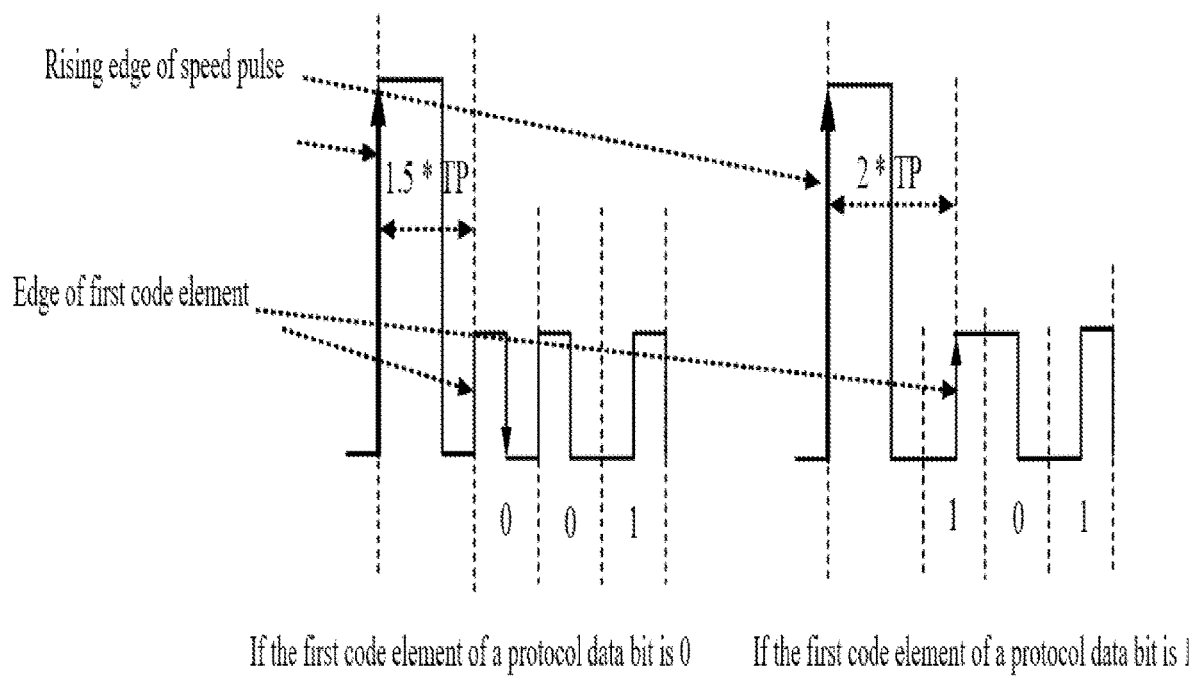
FIG. 13 is a schematic diagram of parsing of a protocol data bit $bit_0$.

As shown in FIG. 12, the protocol data bit uses Manchester encoding (IEEE 802.3), and the encoding rule thereof is: the jump of the intermediate level of the bit from low to high indicates "1"; and the jump of the intermediate level of the bit from high to low indicates "0". According to the AK protocol standard, as shown in FIG. 5, the width of the speed pulse is TP (with the nominal value of 50 us), and the code element width of the falling edge of the speed pulse and the first protocol data bit is TP/2.

The code element in the protocol data timestamp can be determined based on this, and the value of each protocol data bit is parsed based on the Manchester encoding rule and the code element width of the falling edge of the speed pulse and the first protocol data bit of TP/2. The specific process is as follows:

Determining a value of a first protocol data bit based on a first timestamp among the sorted protocol data timestamps:

If $TimeStamp_0 - TimeStamp_{-2} = 1.5$ TP, $bit_0 = 0$;

If $TimeStamp_0 - TimeStamp_{-2} = 2$ TP, $bit_0 = 1$;

Wherein $TimeStamp_0$ is the first timestamp among the sorted protocol data timestamps, and $TimeStamp_{-2}$ is a second timestamp before $TimeStamp_0$ in the first timestamp set; and $bit_0$ is the value of the first protocol data bit;

When $bit_k = 0$, a timestamp corresponding to a center edge of the protocol data bit $bit_k$ is $TimeStamp_{k+1}$, calculating the difference between $TimeStamp_{k+2}$ and $TimeStamp_{k+1}$ and denoting as first difference; if the first difference is TP/2, $bit_{k+1} = 0$; if the first difference is TP, $bit_{k+1} = 1$;

When $bit_k = 1$, a timestamp corresponding to a center edge of the protocol data bit $bit_k$ is $TimeStamp_k$, calculating the difference between $TimeStamp_{k+1}$ and $TimeStamp_k$ and denoting as second difference; if the second difference is TP/2, $bit_{k+1} = 0$; if the second difference is TP, $bit_{k+1} = 1$, wherein $0 \leq k \leq 6$, and TP is pulse width;

Determining a value of $bit_8$ according to the sum of $bit_0$ to $bit_7$, if the sum of $bit_0$ to $bit_7$ is even, $bit_8 = 0$, and if the sum of $bit_0$ to $bit_7$ is odd, $bit_8 = 1$.

With the high-speed conditions as an example, according to the timestamps (protocol data timestamps) cached to Buffer_CalAKBitTimeStamp, (i-2) corresponds to the rising edge of the speed pulse in FIG. 8; and i corresponds to an edge of a first code element. As shown in FIG. 8 to FIG. 13, if $TimeStamp_i - TimeStamp_{i-2} = 1.5$ TP, the middle position of the first code element is a falling edge, that is, the value of the first protocol data bit $bit_0$ is 0; and if $TimeStamp_i - TimeStamp_{i-2} = 2$ TP, the middle position of the first code element is a rising edge, that is, the value of the first protocol data bit $bit_0$ is 1.

When $bit_0 = 0$, the timestamp corresponding to the center edge of the protocol data bit $bit_0$ is $TimeStamp_i + 1$. If $TimeStamp_{i+2} - TimeStamp_{i+1} = TP/2$, $bit_1 = 0$; and if $TimeStamp_{i+2} - TimeStamp_i + 1 = TP$, $bit_1 = 1$.

When $bit_0 = 1$, the timestamp corresponding to the center edge of the protocol data bit $bit_0$ is $TimeStamp_i$. If $TimeStamp_i + 1 - TimeStamp_i = TP/2$, $bit_1 = 0$; and if $TimeStamp_i + 1 - TimeStamp_i = TP$, $bit_1 = 0$.

The parsing method for $bit_2$ to $bit_7$ follows the above recursion, and finally, the value of $bit_8$ is obtained according to the values of $bit_0$ to $bit_7$.

The embodiments of the present application capture the timestamps of the protocol data bits of the AK protocol based on the separation circuit through the processor. According to the captured timestamps, the protocol data bits are parsed based on the characteristics of the AK protocol, so as to acquire the field amplitude, mode status, direction information and check information of an AK protocol wheel speed sensor.

Embodiment 2

Figure 14:
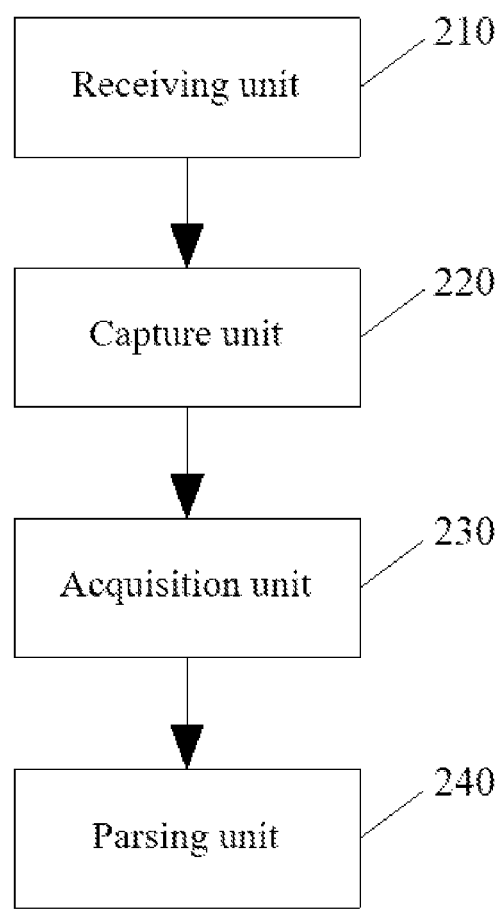
FIG. 14 is a flow diagram of a protocol data bit parsing device for an AK protocol wheel speed sensor disclosed in embodiments of the present application.

Referring to FIG. 14, FIG. 14 is a structural schematic diagram of a protocol data bit parsing device for an AK protocol wheel speed sensor disclosed in embodiments of the present application. As shown in FIG. 14, the protocol data bit parsing device for an AK protocol wheel speed sensor can comprise:

A receiving unit 210, used for receiving a current signal sent by an AK protocol wheel speed sensor and converting the current signal into a first voltage signal and a second voltage signal, wherein the first voltage signal includes a speed signal pulse and a protocol data bit pulse, and the second voltage signal only includes a speed signal pulse;

A capture unit 220, used for capturing the time of rising edges and falling edges of the first voltage signal and the second voltage signal, denoting timestamps of the rising edge and the falling edge of the captured first voltage signal as a first timestamp set, denoting timestamps of the rising edge and the falling edge of the captured second voltage signal as a second timestamp set and saving the first timestamp set and the second timestamp set;

An acquisition unit 230, used for acquiring a complete set of timestamps of protocol data bits according to the first timestamp set and the second timestamp set and denoting as protocol data timestamps;

A parsing unit 240, used for parsing the protocol data bits according to the protocol data timestamps to obtain values of the protocol data bits.

As an optional solution, the receiving unit 210 can comprise:

Converting the current signal into a first voltage signal and a second voltage signal based on signal comparison through an AK signal separation circuit.

As an optional solution, under the high-speed conditions, the acquisition unit 230 can comprise:

Within a preset sampling period, determining a timestamp of a rising edge of a last speed pulse and a timestamp of a falling edge of a second last speed pulse based on the second timestamp set, and denoting as a first benchmark high-speed timestamp and a second benchmark high-speed timestamp respectively;

Acquiring all first timestamp sets between the first benchmark high-speed timestamp and the second benchmark high-speed timestamp, wherein all the first timestamp sets between the first benchmark high-speed timestamp and the second benchmark high-speed timestamp are the protocol data timestamps.

As an optional solution, under the low-speed conditions, the acquisition unit 230 can comprise:

Within a preset sampling period, sorting the first timestamp sets within the sampling period in chronological order from back to front;

Selecting a preset number of first timestamps in chronological order from the sorted first timestamp sets to constitute the protocol data timestamps, wherein the difference between adjacent first timestamps among the protocol data timestamps is within [TP/2, TP], and TP is pulse width.

As an optional solution, under the low-speed to high-speed conditions, the acquisition unit 230 can comprise:

Within a preset sampling period, determining a timestamp of a rising edge of a last speed pulse based on the second timestamp set, and denoting as a first benchmark high-speed timestamp;

From the first benchmark high-speed timestamp, sorting the first timestamp sets within the sampling period in chronological order from back to front;

Selecting a preset number of first timestamps in chronological order from the sorted first timestamp sets to constitute the protocol data timestamps, wherein the difference between adjacent first timestamps among the protocol data timestamps is within [TP/2, TP], and TP is pulse width.

As an optional solution, the parsing unit 240 can comprise:

A sorting subunit, used for sorting the protocol data timestamps in chronological order;

A determining subunit, used for determining a value of a first protocol data bit based on a first timestamp among the sorted protocol data timestamps:

If $TimeStamp_0 - TimeStamp_{-2} = 1.5\ TP$, $bit_0 = 0$;

If $TimeStamp_0 - TimeStamp_{-2} = 2\ TP$, $bit_0 = 1$;

Wherein $TimeStamp_0$ is the first timestamp among the sorted protocol data timestamps, and $TimeStamp_{-2}$ is a second timestamp before $TimeStamp_0$ in the first timestamp set; and $bit_0$ is the value of the first protocol data bit;

A first parsing subunit, used for: when $bit_k = 0$, a timestamp corresponding to a center edge of the protocol data bit $bit_k$ is $TimeStamp_{k+1}$, calculating the difference between $TimeStamp_{k+2}$ and $TimeStamp_{k+1}$ and denoting as a first difference; if the first difference is TP/2, $bit_{k+1} = 0$; if the first difference is TP, $bit_{k+1} = 1$;

A second parsing subunit, used for: when $bit_k = 1$, a timestamp corresponding to a center edge of the protocol data bit $bit_k$ is $TimeStamp_k$, calculating the difference between $TimeStamp_{k+1}$ and $TimeStamp_k$ and denoting as second difference; if the second difference is TP/2, $bit_{k+1} = 0$; if the second difference is TP, $bit_{k+1} = 1$, wherein $0 \leq k \leq 6$, and TP is pulse width;

Determining a value of $bit_8$ according to the sum of $bit_0$ to $bit_7$, if the sum of $bit_0$ to $bit_7$ is even, $bit_8 = 0$, and if the sum of $bit_0$ to $bit_7$ is odd, $bit_8 = 1$.

Embodiment 3

Figure 15:
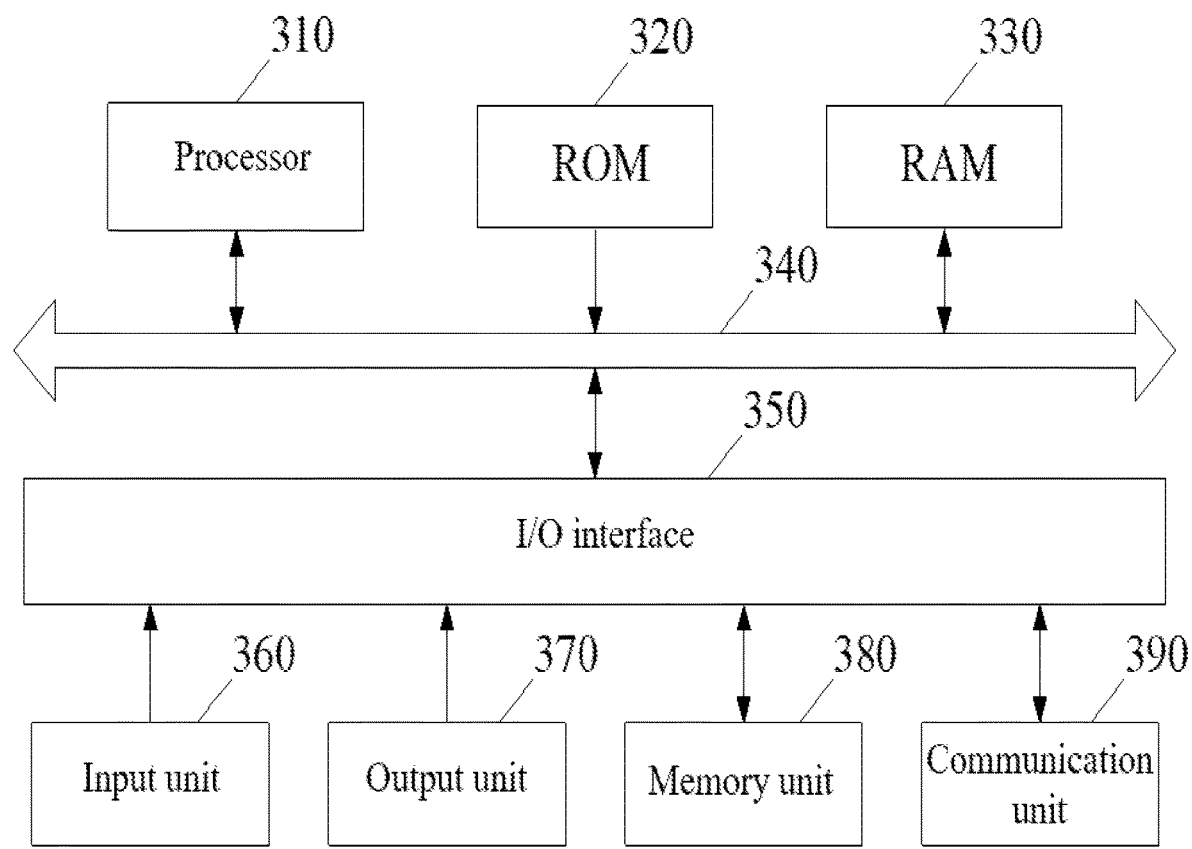
FIG. 15 is a structural schematic diagram of an electronic device disclosed in embodiments of the present application.

Referring to FIG. 15, FIG. 15 is a structural schematic diagram of an electronic device that can be used for implementing the embodiments of the present application. The electronic device is intended to represent various forms of digital computers such as laptop computers, desktop computers, workbenches, personal digital assistants, servers, blade servers, mainframe computers and other suitable computers. The electronic device can also represent various forms of mobile devices such as personal digital assistants, cell phones, smart phones, wearable devices (such as helmets, glasses and watches) and other similar computing devices. The components shown herein as well as connections, relationships and functions thereof are only examples and are not intended to limit the implementation of the embodiments of the present application as described and/or claimed herein.

As shown in FIG. 15, the electronic device comprises at least one processor 310 and a memory such as a read-only memory (ROM) 320 and a random access memory (RAM) 330 which is communicatively connected with the at least one processor 310, wherein the memory stores a computer program that can be executed by the at least one processor, and the processor 310 can perform various appropriate actions and processing according to the computer program stored in the ROM 320 or loaded from a memory unit 380 into the RAM 330. The RAM 330 also can store various programs and data required for the operation of the electronic device. The processor 310, the ROM 320 and the RAM 330 are connected to each other through a bus 340. An input/output (I/O) interface 350 is also connected to the bus 340.

A plurality of components in the electronic device are connected to the I/O interface 350, comprising an input unit 360, such as a keyboard and a mouse; an output unit 370, such as various displays and loudspeakers; a memory unit 380, such as a magnetic disk and an optical disk; and a communication unit 390, such as a network card, a modem and a wireless communication transceiver. The communication unit 390 allows the electronic device to exchange information/data with other devices over computer networks such as Internet or/and various telecommunication networks.

The processor 310 can be a variety of general or/and special processing components with processing and computing capabilities. Some examples of the processor 310 include but are not limited to a central processing unit (CPU), a graphics processing unit (GPU), various special artificial intelligence (AI) computing chips, various processors running machine learning model algorithms, a digital signal processor (DSP) and any appropriate processor, controller and microcontroller. The processor 310 executes one or more steps of the protocol data bit parsing method for an AK protocol wheel speed sensor described above.

In some embodiments, a protocol data bit parsing method for an AK protocol wheel speed sensor can be implemented as a computer program that is physically contained in a computer readable storage medium, such as a memory unit 380. In some embodiments, some or all of the computer program may be loaded and/or installed into the electronic device via the ROM 320 or/and the communication unit 390. When the computer program is loaded into the RAM 330 and executed by the processor 310, one or more steps of the protocol data bit parsing method for an AK protocol wheel speed sensor described above can be executed. Alternatively, in other embodiments, the processor 310 can be configured in any other appropriate manner (for example, by means of firmware) to execute a protocol data bit parsing method for an AK protocol wheel speed sensor.

Various embodiments of the systems and technologies described above herein can be implemented in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software or/and a combination thereof. These various embodiments can include: implementation in one or more computer programs, one or more computer programs can be executed and/or interpreted on a programmable system including at least one programmable processor, and the programmable processor can be a special or general programmable processor, which can receive data and instructions from a memory system, at least one input device and at least one output device and transmits the data and instructions to the memory system, the at least one input device and the at least one output device.

The computer programs for implementing the method of the embodiments of the present application can be written in one or any combination of more programming languages. The computer programs can be provided for a processor of a general computer, a special computer or other programmable data processing devices so that the computer programs implement functions/operations specified in the flow chart or/and the block diagram when executed by the processor. The computer programs can be executed completely or partially on a machine, as a stand-alone software package partially on a machine and partially on a remote machine, or completely on a remote machine or server.

In the context of the embodiments of the present application, the computer readable storage medium can be a tangible medium which can contain or store computer programs for use by or in conjunction with an instruction execution system, device or equipment. The computer readable storage medium can include but are not limited to electronic, magnetic, optical, electromagnetic, infrared or semiconductor systems, devices or equipment, or any suitable combination thereof. Alternatively, the computer readable storage medium can be a machine-readable signal medium. More specific examples of the machine-readable storage medium will include electrical connection based on one or more wires, a portable computer disk, a hard disk, a random access memory (RAM), a read-only memory (ROM), an erasable programmable read-only memory (EPROM or flash memory), optical fibers, a portable compact disc read-only memory (CD-ROM), an optical storage device, a magnetic storage device or any suitable combination thereof.

To provide interaction with a user, the systems and technologies described herein can be implemented on the electronic device, and the electronic device has: a display device (for example, a cathode ray tube (CRT) or a liquid crystal display (LCD) monitor) for displaying information to the user, a keyboard and a pointing device (for example, a mouse or a trackball), and the user can provide input for the electronic device through the keyboard and the pointing device. Other kinds of devices can also be used for providing interaction with the user; for example, the feedback provided for the user can be any form of sensory feedback (for example, visual feedback, auditory feedback or tactile feedback); and the input from the user can be received in any form (including vocal input, speech input or tactile input).

The systems and technologies described herein can be implemented in a computing system (for example, as a data server) including back-end components, a computing system (for example, an application server) including middleware components, a computing system (for example, a user computer with a graphical user interface or a web browser through which the user can interact with the embodiments of the systems and technologies described herein) including front-end components, or a computing system including any combination of such back-end components, middleware components or front-end components. The components of the systems can be connected to each other through digital data communication (for example, a communication network) in any form or medium. Examples of the communication network include: a local area network (LAN), a wide area network (WAN), a block chain network and Internet.

The computing system can comprise a client and a server. The client and the server are generally far away from each other and usually interact with each other over the communication network. A client-server relationship is generated by computer programs that run on the corresponding computer and have a client-server relationship with each other. The server can be a cloud server, also called a cloud computing server or a cloud host, which is a host product in a cloud computing service system, so as to solve the defects of great management difficulty and weak service expansibility in the traditional physical hosts and VPS service.

The protocol data bit parsing method and device for an AK protocol wheel speed sensor disclosed in the present application is described in detail above. Specific individual cases are applied herein for elaborating the principle and embodiments of the present application. The illustration of the above embodiments is merely used for helping to understand the method and the core thought of the present application. Meanwhile, for those ordinary skilled in the art, specific embodiments and the application scope may be changed in accordance with the thought of the present application. In conclusion, the contents of the description shall not be interpreted as a limitation to the present application.

What is claimed is:

1. A protocol data bit parsing method for an ArbeitsKreis (AK) protocol wheel speed sensor, comprising the following steps:

receiving a current signal sent by an AK protocol wheel speed sensor and converting the current signal into a first voltage signal and a second voltage signal, wherein the first voltage signal includes a speed signal pulse and a protocol data bit pulse, and the second voltage signal only includes a speed signal pulse;

capturing the time of rising edges and falling edges of the first voltage signal and the second voltage signal, denoting timestamps of the rising edge and the falling edge of the captured first voltage signal as a first timestamp set, denoting timestamps of the rising edge and the falling edge of the captured second voltage signal as a second timestamp set and saving the first timestamp set and the second timestamp set;

acquiring a complete set of timestamps of protocol data bits according to the first timestamp set and the second timestamp set and denoting as protocol data timestamps;

wherein:

under high-speed conditions, within a preset sampling period, determining a timestamp of a rising edge of a last speed pulse and a timestamp of a falling edge of a second last speed pulse based on the second timestamp set, and denoting as a first benchmark high-speed timestamp and a second benchmark high-speed timestamp respectively; and acquiring all first timestamp sets between the first benchmark high-speed timestamp and the second benchmark high-speed timestamp, wherein all the first timestamp sets between the first benchmark high-speed timestamp and the second benchmark high-speed timestamp are the protocol data timestamps;

under low-speed conditions, within a preset sampling period, sorting the first timestamp sets within the sampling period in chronological order from back to front; and selecting a preset number of first timestamps in chronological order from the sorted first timestamp sets to constitute the protocol data timestamps, wherein the difference between adjacent first timestamps among the protocol data timestamps is within [TP/2, TP], and TP is pulse width;

under low-speed to high-speed conditions, within a preset sampling period, determining a timestamp of a rising edge of a last speed pulse based on the second timestamp set, and denoting as a first benchmark high-speed timestamp; from the first benchmark high-speed timestamp, sorting the first timestamp sets within the sampling period in chronological order from back to front; and selecting a preset number of first timestamps in chronological order from the sorted first timestamp sets to constitute the protocol data timestamps, wherein the difference between adjacent first timestamps among the protocol data timestamps is within [TP/2, TP];

parsing the protocol data bits according to the protocol data timestamps to obtain values of the protocol data bits.

2. The protocol data bit parsing method for an AK protocol wheel speed sensor according to claim 1, wherein the step of receiving a current signal sent by an AK protocol wheel speed sensor and converting the current signal into a first voltage signal and a second voltage signal comprises:

converting the current signal into a first voltage signal and a second voltage signal based on signal comparison through an AK signal separation circuit.

3. The protocol data bit parsing method for an AK protocol wheel speed sensor according to claim 1, wherein the step of parsing the protocol data bits according to the protocol data timestamps to obtain values of the protocol data bits comprises:

sorting the protocol data timestamps in chronological order;

determining a value of a first protocol data bit based on a first timestamp among the sorted protocol data timestamps:

if $TimeStamp_0 - TimeStamp_{-2} = 1.5\ TP$, $bit_0 = 0$;

if $TimeStamp_0 - TimeStamp_{-2} = 2\ TP$, $bit_0 = 1$;

wherein $TimeStamp_0$ is the first timestamp among the sorted protocol data timestamps, and $TimeStamp_{-2}$ is a second timestamp before $TimeStamp_0$ in the first timestamp set; and $bit_0$ is the value of the first protocol data bit;

when $bit_k = 0$, a timestamp corresponding to a center edge of the protocol data bit $bit_k$ is $TimeStamp_{k+1}$, calculating the difference between $TimeStamp_{k+2}$ and $TimeStamp_{k+1}$ and denoting as first difference; if the first difference is TP/2, $bit_{k+1} = 0$; if the first difference is TP, $bit_{k+1} = 1$; $bit_k$ is a value of a $(k+1)^{th}$ protocol data bit, and $bit_k + 1$ is a value of a $(k+2)^{th}$ protocol data bit; when $bit_k = 1$, a timestamp corresponding to a center edge of the protocol data bit $bit_k$ is $TimeStamp_k$, calculating the difference between $TimeStamp_{k+1}$ and $TimeStamp_k$ and denoting as second difference; if the second difference is TP/2, $bit_{k+1} = 0$; if the second difference is TP, $bit_{k+1} = 1$, wherein $0 \leq k \leq 6$, and TP is pulse width; $TimeStamp_k$ is a $(k+1)^{th}$ timestamp among the sorted protocol data timestamps, $TimeStamp_{k+1}$ is a $(k+2)^{th}$ timestamp among the sorted protocol data timestamps, and $TimeStamp_{k+2}$ is a $(k+3)^{th}$ timestamp among the sorted protocol data timestamps; and determining a value of $bit_8$ according to the sum of $bit_0$ to $bit_7$, if the sum of $bit_0$ to $bit_7$ is even, $bit_8 = 0$, if the sum of $bit_0$ to $bit_7$ is odd, $bit_8 = 1$, $bit_7$ is a value of an $8^{th}$ protocol data bit, and $bit_8$ is a value of a $9^{th}$ protocol data bit.

4. A protocol data bit parsing device for an ArbeitsKreis (AK) protocol wheel speed sensor, comprising:

a receiving unit, used for receiving a current signal sent by an AK protocol wheel speed sensor and converting the current signal into a first voltage signal and a second voltage signal, wherein the first voltage signal includes a speed signal pulse and a protocol data bit pulse, and the second voltage signal only includes a speed signal pulse;

a capture unit, used for capturing the time of rising edges and falling edges of the first voltage signal and the second voltage signal, denoting timestamps of the rising edge and the falling edge of the captured first voltage signal as a first timestamp set, denoting timestamps of the rising edge and the falling edge of the captured second voltage signal as a second timestamp set and saving the first timestamp set and the second timestamp set;

an acquisition unit, used for acquiring a complete set of timestamps of protocol data bits according to the first timestamp set and the second timestamp set and denoting as protocol data timestamps;

wherein:

under high-speed conditions, within a preset sampling period, determining a timestamp of a rising edge of a last speed pulse and a timestamp of a falling edge of a second last speed pulse based on the second timestamp set, and denoting as a first benchmark high-speed timestamp and a second benchmark high-speed timestamp respectively; and acquiring all first timestamp sets between the first benchmark high-speed timestamp and the second benchmark high-speed timestamp, wherein all the first timestamp sets between the first benchmark high-speed timestamp and the second benchmark high-speed timestamp are the protocol data timestamps;

under low-speed conditions, within a preset sampling period, sorting the first timestamp sets within the sampling period in chronological order from back to front; and selecting a preset number of first timestamps in chronological order from the sorted first timestamp sets to constitute the protocol data timestamps, wherein the difference between adjacent first timestamps among the protocol data timestamps is within [TP/2, TP], and TP is pulse width;

under low-speed to high-speed conditions, within a preset sampling period, determining a timestamp of a rising edge of a last speed pulse based on the second timestamp set, and denoting as a first benchmark high-speed timestamp; from the first benchmark high-speed timestamp, sorting the first timestamp sets within the sampling period in chronological order from back to front; and selecting a preset number of first timestamps in chronological order from the sorted first timestamp sets to constitute the protocol data timestamps, wherein the difference between adjacent first timestamps among the protocol data timestamps is within [TP/2, TP]; a parsing unit, used for parsing the protocol data bits according to the protocol data timestamps to obtain values of the protocol data bits.

5. The protocol data bit parsing device for an AK protocol wheel speed sensor according to claim 4, wherein the parsing unit comprises:

a sorting subunit, used for sorting the protocol data timestamps in chronological order;

a determining subunit, used for determining a value of a first protocol data bit based on a first timestamp among the sorted protocol data timestamps:

if $TimeStamp_0 - TimeStamp_{-2} = 1.5\ TP$, $bit_0 = 0$;

if $TimeStamp_0 - TimeStamp_{-2} = 2\ TP$, $bit_0 = 1$;

wherein $TimeStamp_0$ is the first timestamp among the sorted protocol data timestamps, and $TimeStamp_{-2}$ is a second timestamp before $TimeStamp_0$ in the first timestamp set; and $bit_0$ is the value of the first protocol data bit;

a first parsing subunit, used for: when $bit_k = 0$, a timestamp corresponding to a center edge of the protocol data bit $bit_k$ is $TimeStamp_{k+1}$, calculating the difference between $TimeStamp_{k+2}$ and $TimeStamp_{k+1}$ and denoting as a first difference; if the first difference is TP/2, $bit_{k+1} = 0$; if the first difference is TP, $bit_{k+1} = 1$; $bit_k$ is a value of a $(k+1)^{th}$ protocol data bit, and $bit_k + 1$ is a value of a $(k+2)^{th}$ protocol data bit;

a second parsing subunit, used for: when $bit_k = 1$, a timestamp corresponding to a center edge of the protocol data bit $bit_k$ is $TimeStamp_k$, calculating the difference between $TimeStamp_{k+1}$ and $TimeStamp_k$ and denoting as second difference; if the second difference is TP/2, $bit_{k+1} = 0$; if the second difference is TP, $bit_{k+1} = 1$, wherein $0 \leq k \leq 6$, and TP is pulse width; $TimeStamp_k$ is a $(k+1)^{th}$ timestamp among the sorted protocol data timestamps, $TimeStamp_{k+1}$ is a $(k+2)^{th}$ timestamp among the sorted protocol data timestamps, and $TimeStamp_{k+2}$ is a $(k+3)^{th}$ timestamp among the sorted protocol data timestamps;

determining a value of $bit_8$ according to the sum of $bit_0$ to $bit_7$, if the sum of $bit_0$ to $bit_7$ is even, $bit_8 = 0$, if the sum of $bit_0$ to $bit_7$ is odd, $bit_8 = 1$, $bit_7$ is a value of an $8^{th}$ protocol data bit, and $bit_8$ is a value of a $9^{th}$ protocol data bit.

6. A non-transitory computer readable storage medium, which stores a computer program, wherein the computer program enables a computer to execute the protocol data bit parsing method for an AK protocol wheel speed sensor of claim 1.

7. An electronic device, comprising a memory which stores executable program codes and a processor which is coupled to the memory, wherein the processor invokes the executable program codes stored in the memory to execute the protocol data bit parsing method for an AK protocol wheel speed sensor of claim 1.

* * * * *